United States Patent [19]

Higashi et al.

[11] Patent Number: 4,874,834

[45] Date of Patent: Oct. 17, 1989

[54] COLORLESS TRANSPARENT POLYIMIDE SHAPED ARTICLE AND PROCESS FOR PRODUCING THE SAME

[75] Inventors: Kazumi Higashi; Yuzuru Noda, both of Osaka, Japan

[73] Assignee: Nitto Electric Industrial Co., Ltd., Osaka, Japan

[21] Appl. No.: 22,898

[22] Filed: Mar. 6, 1987

[51] Int. Cl.[4] .............................................. C08G 69/26

[52] U.S. Cl. .................................... 528/176; 528/188; 528/229; 528/353

[58] Field of Search ................ 528/176, 188, 229, 353

[56] References Cited

U.S. PATENT DOCUMENTS

| | | | |
|---|---|---|---|
| 3,234,181 | 2/1966 | Olivier | 528/353 |
| 3,789,048 | 1/1974 | Incremona | 524/726 |
| 4,429,102 | 1/1984 | Evans et al. | 528/172 |

FOREIGN PATENT DOCUMENTS

| | | |
|---|---|---|
| 2005967 | 8/1971 | Fed. Rep. of Germany . |
| 2578545 | 3/1986 | France . |
| 2174399 | 9/1986 | United Kingdom . |

OTHER PUBLICATIONS

Synthesis and Characterization of Essentially Colorless Polyimide Films: Anne K. St. Clair et al.

Evaluation of Colorless Polyimide Film For Thermal Control Coating Application (Jan. 1985): Anne K. St. Clair et al.

*Primary Examiner*—John Kight
*Assistant Examiner*—M. L. Moore
*Attorney, Agent, or Firm*—Sughrue, Mion, Zinn, Macpeak & Seas

[57] ABSTRACT

A colorless transparent polyimide shaped article having as a main component at least one recurring unit selected from the recurring units of the formulae (I) to (III), which is useful, for example, as an oriented film in liquid crystal display devices. The polyimide shaped article is produced by a process which comprises preparing a solution of (A) a polyimide precursor obtained by reacting a diamino compound comprising as a main component at least one aromatic diamine having amino groups at the m-position selected from diamines of formulae (IV) to (VI) with a tetracarboxylic acid compound comprising as a main component a tetracarboxylic acid dianhydride of formula (VII) dissolved in (B) at least one organic polar solvent selected from N,N-dimethylacetamide, N,N-dimethylformamide, bis(2-methoxyethyl)ether, cresol and halogenated phenols; forming a shaped article of the polyimide precursor from the solution; and imidizing the resulting shaped article.

11 Claims, No Drawings

COLORLESS TRANSPARENT POLYIMIDE SHAPED ARTICLE AND PROCESS FOR PRODUCING THE SAME

FIELD OF THE INVENTION

The present invention relates to colorless transparent polyimide shaped article for use as, for example, a liquid crystalline oriented film, and to a process for producing the same.

BACKGROUND OF THE INVENTION

Liquid crystalline oriented films are required to have good transparency and superior electrical and mechanical properties. Polyimide films satisfying these requirements find extensive use as the liquid crystalline oriented films. The polyimide films have excellent electrical and mechanical properties and also have a good transparency, but the transparency is a colored transparency. Therefore, it has been demanded to develop polyimides free from such coloration.

To this effect, various polyimides have hitherto been proposed. Of such polyimides, the aromatic polyimide having a recurring unit shown below has a small degree of coloration and high transparency and is useful as an excellent polyimide oriented film, as disclosed in Japanese Patent Application (OPI) No. 91430/83 (the term "OPI" as used herein refers to a "published unexamined Japanese patent application").

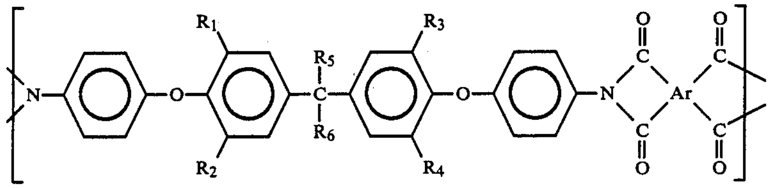

wherein $R_1$, $R_2$, $R_3$ and $R_4$, which may be the same or different, each represents a hydrogen atom, a lower alkyl group, a lower alkoxy group, a chlorine atom, or a bromine atom; $R_5$ and $R_6$, which may be the same or different, each represents a hydrogen atom, a methyl group, an ethyl group, a trifluoromethyl group, or a trichloromethyl group; and Ar represents a residue of an aromatic tetracarboxylic acid.

Although the above-described polyimide oriented film has excellent transparency, it is still colored yellow and has not been proved to be entirely satisfactory for use as a liquid crystalline oriented film.

SUMMARY OF THE INVENTION

As a result of a series of studies on the cause of coloration of polyimide films, it has been found that the coloration of a polyimide depends greatly upon the combination of an aromatic tetracarboxylic acid dianhydride and a diamino compound used as starting materials for the polyimide. It has been also found that 3,3',4,4'-diphenylsulfonetetracarboxylic acid dianhydride is especially effective to improve colorless transparency of polyimide films, and a combination of this compound with an aromatic diamine having amino group at the m-position thereof can lead to the formation of an almost completely colorless transparent polyimide shaped article. The present invention has been completed based on these findings.

Accordingly, one object of the present invention is to provide a colorless transparent polyimide shaped article free from coloration.

Another object of the present invention is to provide a process for producing such a polyimide shaped article.

The colorless transparent polyimide shaped article according to the present invention comprises as a main component at least one of recurring units represented by formulae (I), (II) and (III) shown below.

Formula (I) is represented by

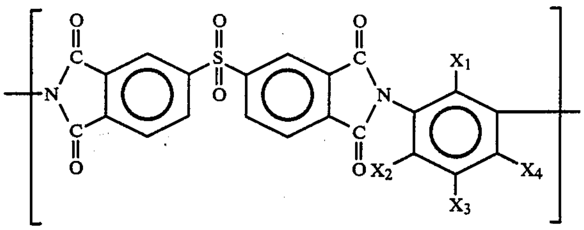

(I)

wherein $X_1$, $X_2$, $X_3$ and $X_4$, which may be the same or different, each represents —H, —$CH_3$, —$C_2H_5$, —$NO_2$, —F, —COOH or —Cl.

Formula (II) is represented by

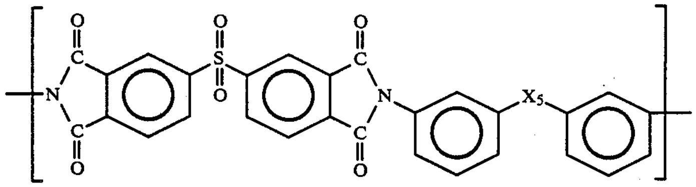

(II)

wherein $X_5$ represents —O—, —$SO_2$—, —S—, —CO or

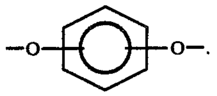

wherein $X_1$, $X_2$, $X_3$ and $X_4$ are the same as defined above.

Formula (V) is represented by

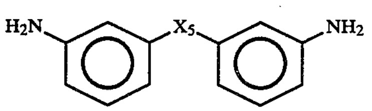 (V)

Formula (III) is represented by

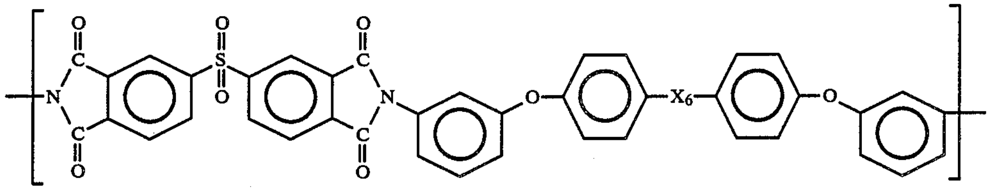 (III)

wherein $X_6$ represents —$SO_2$—, —$C(CH_3)_2$— or —$C(CF_3)_2$—.

The process for producing a colorless transparent polyimide according to the present invention comprises:

preparing a solution of (A) a polyimide precursor obtained by reacting a diamino compound comprising as a main component at least one of diamines represented by formulae (IV), (V) and (VI) shown below with a tetracarboxylic acid compound comprising as a main component a tetracarboxylic acid dianhydride represented by formula (VII) shown below, dissolved in (B) at least one organic polar solvent selected from the group consisting of dimethylacetamide, dimethylformamide, bis(2-methoxyethyl)ether, cresol and halogenated phenols;

forming a shaped article of the polyimide precursor from the organic polar solvent solution of the polyimide precursor; and imidizing the resulting shaped article of the polyimide precursor.

Formula (IV) is represented by

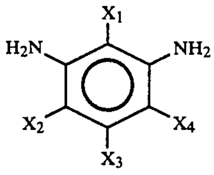 (IV)

wherein $X_5$ is the same as defined above.

Formular (VI) is represented by

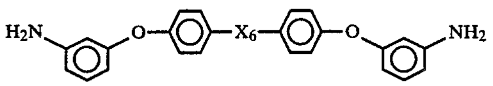 (VI)

wherein $X_6$ is the same as defined above.

Formula (VII) is represented by

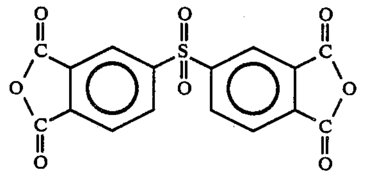 (VII)

DETAILED DESCRIPTION OF THE INVENTION

The colorless transparent polyimide shaped article according to the present invention can be obtained by reacting 3,3',4,4,-diphenylsulfonetetracarboxylic acid dianhydride represented by the above described formula (VII) with an aromatic diamine having amino groups at the m-position thereof as represented by the above-described formula (IV), (V) or (VI).

Typical examples of the aromatic diamines having amino groups at the m-position are shown below.

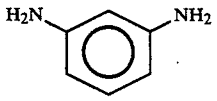

m-Phenylenediamine

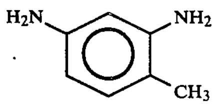

2,4-Tolylenediamine

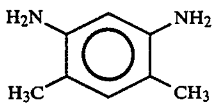

4,6-Dimethyl-m-phenylenediamine

-continued
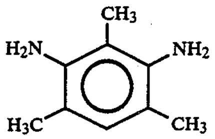
2,4-Diaminomesitylene
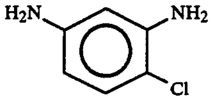
4-Chloro-m-phenylenediamine
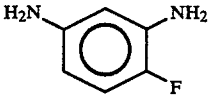
4-Fluoro-m-phenylenediamine
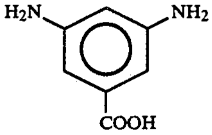
3,5-Diaminobenzoic acid
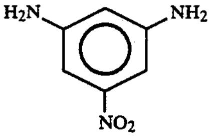
5-Nitro-m-phenylenediamine
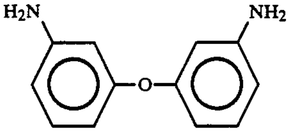
3,3'-Diaminodiphenylether
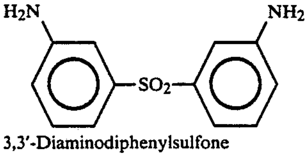
3,3'-Diaminodiphenylsulfone
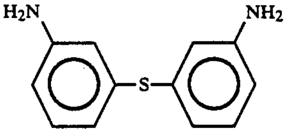
3,3'-Diaminodiphenyl thioether
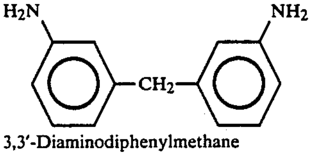
3,3'-Diaminodiphenylmethane
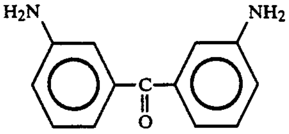
3,3'-Diaminobenzophenone -continued

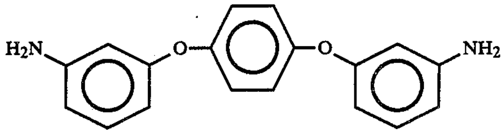

1,4-Bis(3-aminophenoxy)benzene

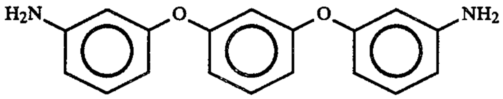

1,3-Bis(3-aminophenoxy)benzene

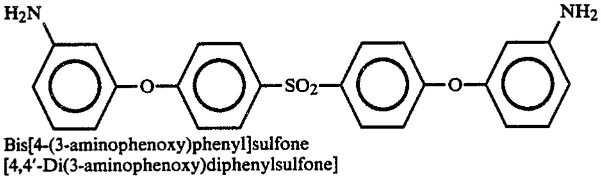

Bis[4-(3-aminophenoxy)phenyl]sulfone
[4,4'-Di(3-aminophenoxy)diphenylsulfone]

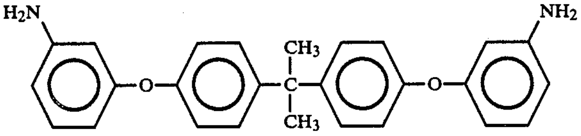

2,2-Bis[4-(3-aminophenoxy)phenyl]propane

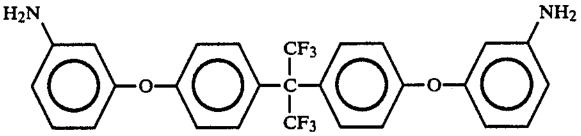

2,2-Bis[4-(3-aminophenoxy)phenyl]hexafluoropropane

These aromatic diamines may be used either individually or in appropriate combinations thereof.

The tetracarboxylic acid dianhydride which can be reacted with the aromatic diamine having amino groups at the m-position includes not only 3,3',4,4,-diphenylsulfonetetracarboxylic acid dianhydride of the above described formula (VII) but also derivatives of 3,3',4,4'-diphenylsulfonetetracarboxylic acid such as esters, amides, halides, monohydride, etc. (hereinafter inclusively referred to as "tetracarboxylic acid compound"). Of these tetracarboxylic acid compounds, use of the dianhydride of formula (VII) provides good results.

By combining the 3,3',4,4'-diphenylsulfonetetracarboxylic acid dianhydride and the aromatic diamine having amino groups at the m-position and reacting those, a colorless transparent polyimide shaped article having one or more of the recurring units represented by the above-described formulae (I), (II) and (III) as a main component can be obtained. The term "as a main component" as used herein means to include the case where the polyimide consists solely of at least one recurring unit described above.

The colorless transparency of the polyimide shaped article becomes higher as the content of at least one recurring unit of formulae (I) to (III) increases. The colorless transparency required in the present invention can be secured if the polyimide shaped article contains at least 70 mol % of at least one recurring unit of formulae (I) to (III). Hence, so long as the content of the diphenylsulfonetetracarboxylic acid dianhydride of formula (VII) falls within the above-described range, other aromatic tetracarboxylic acid dianhydrides than the diphenylsulfonetetracarboxylic acid dianhydride and other diamino compounds than the aromatic diamino compound having amino groups at the m-position ma be employed. The content of at least one recurring unit of formulae (I) to (III) is preferably 95 mol % or more.

Examples of the other aromatic tetracarboxylic acid dianhydrides include pyromellitic dianhydride, 3,3',4,4'-biphenyltetracarboxylic acid dianhydride, 2,3',3,4'-biphenyltetracarboxylic acid dianhydride, 3,3',4,4'-benzophenonetetracarboxylic acid dianhydride, 3,3',4,4'-diphenylethertetracarboxylic acid dianhydride, 2,2-bis(3,4-dicarboxyphenyl)hexafluoropropane dianhydride, 2,3,6,7-naphthalenetetracarboxylic acid dianhydride, 1,2,5,6-naphthalenetetracarboxylic acid dianhydride, 1,4,5,8-naphthalenetetracarboxylic acid dianhydride and derivatives thereof (e.g., esters). These aromatic tetracarboxylic acid dianhydrides may be used either alone or in combinations.

Examples of the other diamino compounds include 4,4'-diaminodiphenylether, 3,4'-diaminodiphenylether, 4,4'-diaminodiphenylsulfone, 4,4'-diaminodiphenylmethane, 4,4'-diaminobenzophenone, 4,4'-diaminodiphenylpropane, p-phenylenediamine, benzidine, 3,3'-dimethylbenzidine, 4,4'-diaminodiphenyl thioether, 3,3'-dimethoxy-4,4'-diaminodiphenylmethane, 3,3'-dimethyl-4,4'-diaminodiphenylmethne, 2,2-bis(4-aminophenyl)propane, bis[4-(4-aminophenoxy)phenyl]sulfone, 2,2-bis[4-(4-aminophenoxy)phenyl]propane, 2,2-bis[4-(4-aminophenoxy)phenyl]hexafluoropropane, etc. These diamino compounds may be used either alone or in combinations.

The colorless transparent polyimide shaped article according to the present invention can be obtained, for example, by polymerizing the aromatic tetracarboxylic acid dianhydride and diamino compound described above in an organic polar solvent at a temperature of 80° C. or less to form a polyamide acid (polyimide precursor) solution, forming a shaped article of the desired shape from the polyamide acid solution, and removing the organic polar solvent by evaporation in air or an inert gas at a temperature of from 50° to 350° C. under atmospheric or reduced pressure and simultaneously dehydrocyclizing the polyamide acid to a polyimide. It can also be obtained by a chemical imidization method comprising solvent removal and imidization of the polyamide acid using, for example, a benzene solution of pyridine and acetic anhydride.

Examples of the organic polar solvents which can be used in the above-described polymerization preferably include N,N-dimethylformamide, N,N-dimethylacetamide, diglyme[bis(2-methoxyethyl)ether],cresol, halogenated phenols, and the like, with N,N-dimeylacetamide being particularly preferred. These organic polar solvents may be used either individually or in combinations. It should be noted, however, that use of N-methyl-2-pyrrolidone as the organic polar solvent be preferably avoided. N-methyl-2-pyrrolidone partly decomposes upon heating in the case of heating the shaped article of the polyamide acid solution to dehydrocyclize the polyamide acid to a polyimide. The decomposition product of N-methyl-2-pyrrolidone remains in the polyimide and looks blackish brown to cause coloration of the final polyimide shaped article in yellowish brown. To the contrary, since the organic polar solvents enumerated above as preferred examples volatilize before they are decomposed by heating, they do not cause coloration of the final polyimide shaped article as is encountered with N-methyl-2-pyrrolidone. That is, production of colorless transparent polyimide shaped articles can first be achieved by the use of the above-illustrated organic polar solvents, which is one of the features of the present invention.

Nevertheless, the above-described disadvantage associated with N-methyl-2-pyrrolidone, when used as a polymerization solvent, may be eliminated if it is replaced, after synthesis of polyamide acid, with the above-enumerated preferred solvents in which the produced polyamide acid is dissolved. In this case, the above-enumerated preferred solvents serve as diluting solvents. Thus, the polyamide acid may be prepared by using a polymerization solvent and a diluting solvent which are the different type and then dissolving the polyamide acid produced in the different diluting solvent by solvent replacement.

The above-illustrated preferred organic polar solvents may be partly replaced with a poor or good solvent, for example, ethanol, toluene, benzene, xylene, dioxane, tetrahydrofuran, nitrobenzene, etc., so long as it does not impair the transparency of the polymer. The amount of such an additional solvent should be selected so as not to adversely affect the solubility of the resulting polyamide acid and is desirably limited to 40% by weight or less based on the whole solvents used.

In the preparation of the colorless transparent polyimide shaped article, the polyamide acid solution preferably has a logarithmic viscosity in the range of from 0.3 to 5.0, and more preferably from 0.4 to 2.0, as measured in N,N-dimethylacetamide at a concentration of 0.5 g/100 m at 30° C. If the logarithmic viscosity of the polyamide acid solution is too low, the mechanical strength of the resulting polyimide shaped article becomes undesirably low. On the other hand, if the logarithmic viscosity is too high, it is difficult to cast the polyamide acid solution in shaping it into a desired form. From the standpoint of workability, the polyamide acid solution preferably has a concentration of from 5 to 30% by weight, and more preferably from 15 to 25% by weight.

The logarithmic viscosity is calculated in accordance with equation:

$$\text{Logarithmic Viscosity} = \frac{\text{Natural Logarithm} \dfrac{(\text{Viscosity of Solution})}{(\text{Viscosity of Solvent})}}{\text{Concentration of Polymer in Solution}}$$

The viscosity in the equation is measured by a capillary viscometer.

The method for shaping the polyamide acid solution differs depending on the shape of the desired shaped product. For example, in the preparation of a polyimide film, the polyamide acid solution is cast on a mirror surface of a glass plate, a stainless steel plate, or the like to a fixed thickness, and then gradually heated at a temperature of from 100° to 350° C. to effect dehydrocyclization and imidization of the polyamide acid. The removal of the organic polar solvent from the polyamide acid solution and the heating for the imidization of the polyamide acid may be carried out successively. These steps may be carried out under reduced pressure or in an inert gas atmosphere. The characteristic properties of the resulting polyimide film can be improved by finally heating it to about 400° C. for a short period of time. Another method for forming a polyimide film comprises casting the polyamide acid solution on a glass plate or the like, drying it by heating at a temperature of from 100° to 150° C. for a period of from 30 to 120 minutes to form a film, and immersing the film, e.g., in a benzene solution of pyridine and acetic anhydride thereby to remove the solvent and imidize the polyamide to a polyimide.

The polyimide film thus produced is nearly completely colorless transparent. It has highly satisfactory transparency even with an increased thickness because of its freedom from coloration in yellow or yellowish brown as in the conventional polyimide films.

The process for producing a polyimide shaped article according to the present invention is not limited to the above-described film formation, and can be applied to formation of other shaped articles, such as plastic lens. In such applications, thermal imidization or chemical imidization can be selected appropriately to imidize the polyamide acid.

In imidizing the polyamide acid solution to obtain a polyimide, the resulting polyimide preferably has a logarithmic viscosity (measured at 30° C. in 97% sulfuric acid at a concentration of 0.5 g/dl) falling within the range of from 0.3 to 4.0, and more preferably at least 0.4, from the standpoints of its characteristic properties.

Unlike the conventional polyimide shaped articles, the polyimide shaped article according to the present invention has nearly completely colorless transparency and a very high degree of transparency. The terminology "nearly colorless transparent" as used in the present invention means that a transmittance of visible light (500 nm) through a polyimide film having a thickness of $50\pm5$ $\mu$m is at least 85%, and a yellowness index of the film is 20 or less. The transmittance can be measured in accordance with ASTM D-1003, and the yellowness index, in accordance with JIS K-7103.

As described above, the polyimide shaped articles according to the present invention, which are obtained from a combination of diphenylsulfonetetracarboxylic acid dianhydride and a specific aromatic diamine having amino group at the m-position, are not colored yellow or yellowish brown as in the prior art and are nearly completely colorless transparent, thus having a very high degree of transparency. They can be used, therefore, as thick liquid crystalline oriented films as well as base films for solar cells, base materials for polarizing films, coating materials for special aerospace components, such as solar cells and heat control systems, optical materials requiring heat resistance, and coating materials for such optical materials. In addition, since they have a refractive index of 1.7 or higher which is the highest among polymers, they are also useful as plastic lenses or coating materials for lenses.

The present invention will now be explained in greater detail by reference to the following Examples and Comparative Examples, but it should be understood that the present invention is not limited thereto. In the Table given hereinafter, the following abbreviations are used.

DPSA: 3,3',4,4'-Diphenylsulfon etetracarboxylic acid dianhydride
s-BPDA 3,3',4,4'-Biphenyltetracarboxylic acid dianhydride
m-PDA: m-Phenylenediamine
2,4-TDA: 2,4- Tolylenediamine
4,6-DMPA: 4,6-Dimethyl-m-phenylenediamine
2,4-DAM: 2,4-Diaminomesitylene
-CMPA: 4-Chloro-m-phenylenediamine
-FMPA: 4-Fluoro-m-phenylenediamine
3,5-DABA: 3,5-Diaminobenzoic acid
3,3'-DDE: 3,3'-Diaminodiphenylether
3,3'-DDS: 3,3'-Diaminodiphenylsulfone
3,3'-DPE: 3,3'-Diaminodiphenyl thioether
3,3'-DDM: 3,3'-Diaminodiphenylmethane
3,3'-DBP: 3,3'-Diaminobenzophenone
1,4,3-BAPB: 1,4-Bis(3-aminophenoxy)benzene
1,3,3-BAPB: 1,3-Bis(3-aminophenoxy)benzene
3,3'-BAPS: Bis[4-(3-aminophenoxy)phenyl]sulfone
3,3'-BAPP: 2,2-Bis[4-(3-aminophenoxy)phenyl]propane
3,3'-BAPF: 2,2-Bis[4-(3-aminophenoxy)phenyl]hexa fluoropropane
4,4'-DDE: 4,4'-Diaminodiphenylether
4,4'-BAPP: 2,2-Bis[4-(4-aminophenoxy)phenyl]propane
DMAc: N,N-Dimethylacetamide
Diglyme: Bis(2-methoxyethyl)ether
NMP: N-Methyl-2-pyrrolidone

EXAMPLES 1 TO 24 AND COMPARATIVE EXAMPLES 1 TO 3

Each of the solvents and each of the diamino compounds shown in the Table below were charged in a 1-liter separable flask and well mixed at room temperature until the diamino compound was completely dissolved. The amount of the solvent used was such that the concentration of the diamino compound and each of the aromatic tetracarboxylic acid anhydride shown in the Table became 20% by weight.

The aromatic tetracarboxylic acid dianhydride shown in the Table was gradually added to the flask while inhibiting temperature rise due to exotherm. The monomer mixture was allowed to react at room temperature for 4 hours while stirring to prepare a polyamide acid solution having a logarithmic viscosity as shown in the Table below.

The resulting polyamide acid solution was cast on a glass plate to form a film, and the film was heated in a hot air dryer at 120° C. for 60 minutes, further at 180° C. for 60 minutes, and then at 250° C. for 6 hours to imidize the film and to form a polyimide film having a thickness of 50±5 μm. The infrared absorption spectrum of the resulting film showed no absorption inherent to amide acid but had an absorption characteristic of an imido group in the vicinity of 1,780 $cm^{-1}$.

The thus obtained polyimide film was determined for yellowness index and transmittance to visible light (500 nm). The results obtained are shown in the Table below.

The yellowness index was measured with an SM color computer manufactured by Suga Testing Instrument Co., Ltd. Larger yellowness indices indicate higher degrees of yellowness. The transmittance was measured with a spectrophotometer manufactured by Shimazu Corporation. Larger transmittance values show higher degrees of transparency.

TABLE

| | Acid Dianhydride | Diamine | Solvent | Logarithmic Viscosity (Polyamide Acid) | Yellowness Index | Transmittance (%, at 500 nm) |
|---|---|---|---|---|---|---|
| Example | | | | | | |
| 1 | DPSA | m-PDA | DMAc | 1.56 | 9 | 88 |
| 2 | DPSA | 2,4-TDA | MDAc | 1.34 | 17 | 86 |
| 3 | DPSA | 4,6-DMPA | DMAc | 1.31 | 19 | 85 |
| 4 | DPSA | 2,4-DAM | DMAc | 1.10 | 18 | 85 |
| 5 | DPSA | 4-CMPA | DMAc | 1.21 | 16 | 86 |
| 6 | DPSA | 4-FMPA | DMAc | 1.35 | 13 | 87 |
| 7 | DPSA | 3,5-DABA | DMAc | 1.45 | 14 | 87 |
| 8 | DPSA | 3,3'-DDE | DMAc | 1.94 | 6 | 88 |
| 9 | DPSA | 3,3'-DDS | DMAc | 1.35 | 3 | 90 |
| 10 | DPSA | 3,3'-DPE | DMAc | 1.88 | 9 | 88 |
| 11 | DPSA | 3,3'-DDM | DMAc | 1.51 | 14 | 87 |
| 12 | DPSA | 3,3'-DBP | DMAc | 1.53 | 13 | 87 |
| 13 | DPSA | 1,4,3-BAPB | DMAc | 2.04 | 8 | 88 |
| 14 | DPSA | 1,3,3-BAPB | DMAc | 1.94 | 5 | 89 |
| 15 | DPSA | 3,3'-BAPS | DMAc | 2.23 | 3 | 90 |
| 16 | DPSA | 3,3'-BAPP | DMAc | 1.94 | 11 | 88 |
| 17 | DPSA | 3,3'-BAPF | DMSa | 1.20 | 6 | 89 |
| 18 | DPSA (70 mol %)<br>s-BPDA (30 mol %) | 3,3'-DDS | DMAc | 1.67 | 13 | 88 |
| 19 | DPSA (70 mol %) | m-PDA | DMAc | 1.56 | 18 | 85 |

TABLE-continued

| | Acid Dianhydride | Diamine | Solvent | Logarithmic Viscosity (Polyamide Acid) | Yellowness Index | Transmittance (%, at 500 nm) |
|---|---|---|---|---|---|---|
| | PMDA (30 mol %) | | | | | |
| 20 | DPSA | 3,3'-DDE (70 mol %)<br>4.4'-DDE (30 mol %) | DMAc | 1.47 | 15 | 87 |
| 21 | DPSA (70 mol %)<br>s-BPDA (30 mol %) | 3,3'-DDS (70 mol %)<br>4,4'-DDE (30 mol %) | DMAc | 1.60 | 19 | 85 |
| 22 | DPSA | 3,3'-BAPS | diglyme | 2.24 | 4 | 89 |
| 23 | DPSA | 3,3'-DDS | m,p-cresol | 1.76 | 18 | 86 |
| 24 | DPSA | 1,3,3-BAPB | p-chlorophenol | 1.47 | 19 | 85 |
| Comparative Example | | | | | | |
| 1 | DPSA | 4,4'-BAPP | DMAc | 2.41 | 42 | 74 |
| 2 | 2-BPDA | 4,4'-DDE | DMAc | 2.54 | 60 | 70 |
| 3 | s-BPDA | 4,4'-DDE | NMP | 2.67 | 107 | 47 |

In the Table, Examples 1 to 17 show the use of aromatic diamines having amino groups at the m-position. Examples 18 and 19 show the combined use of 3,3',4,4'-diphenylsulfonetetracarboxylic acid dianhydride (DPSA) and other tetracarboxylic acid dianhydride. Example 20 shows the combined use of the diamine having amino groups at the m-position (3,3'-DDE) and other diamine (4,4'-DDE). Example 21 shows the combined use of DPSA and other tetracarboxylic acid dianhydride and the combined use of the diamine having amino groups at the m-position (3,3'-DDS) and other diamine (4,4'-DDE). Example 22 to 24 show the use of diglyme in place of N,N-dimethylacetamide as a solvent.

A is apparent from the Table, all the polyimide films obtained in Examples 1 to 24 have a yellowness index of 20 or less and a transmittance of 85% or more, and are therefore nearly completely colorless transparent. On the contrary, in Comparative Example 1 (the film described in Japanese Patent Application (OPI) No. 91430/83), in which a diamino compound having amino groups at the p-position, not m-position, was used, the film has a larger yellowness index and a lower transmittance than in the Examples. It can be seen that the particularly large yellowness index shows yellow coloration of the film. In Comparative Example 2, in which not only the diamino compound but the tetracarboxylic acid used are out of the scope of the present invention, the yellowness index is further larger. In Comparative Example 3, in which N-methyl-2-pyrrolidone is used as a solvent, the film has far larger yellowness index and lower transmittance than those of Comparative Examples 1 and 2, and is colored yellowish brown.

While the invention has been described in detail and with reference to specific embodiments thereof, it will be apparent to one skilled in the art that various changes and modifications can be made therein without departing from the spirit and scope thereof.

What is claimed is:

1. A colorless transparent polyimide shaped article comprising as a main component at least one recurring unit selected from the group consisting of a recurring unit represented by formula (I)

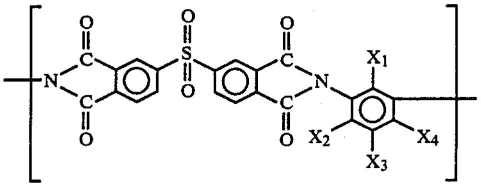

wherein $X_1$, $X_2$, $X_3$ and $X_4$, which may be the same or different, each represents —H, —$CH_3$, —$C_2H_5$, —$NO_2$, —F, —COOH or —Cl a recurring unit represented by formula (II)

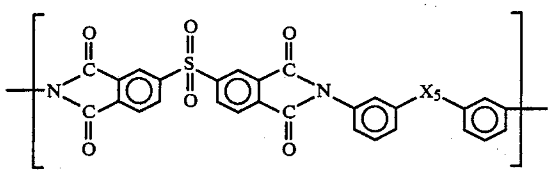

wherein $X_5$ represents —O—, —$SO_2$—, —$CH_2$—, —S—, —CO— or

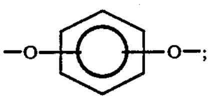

and a recurring unit represented by formula (III)

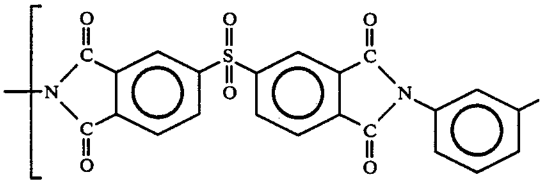

-continued

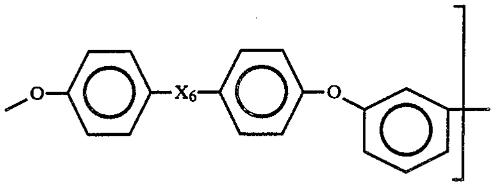

wherein $X_6$ represents $-SO_2-$, $-C(CH_3)_2-$ or $-C(CF_3)_2-$.

2. A colorless transparent polyimide shaped article as in claim 1, wherein the content of at least one recurring unit of formulae (I) to (III) is at least 70 mol %.

3. A colorless transparent polyimide shaped article as in claim 1, wherein the content of at least one recurring unit of formulae (I) to (III) is at least 95 mol %.

4. A colorless transparent polyimide shaped article as in claim 1, wherein the shaped article has a transmittance of sivible light (500 nm) through a polyimide film having a thickness of $50 \pm 5$ μm of 85% or more and a yellowness index of the polyimide film of 20 or less.

5. A process for producing a colorless transparent polyimide shaped article, which comprises preparing a solution of (A) a polyimide precursor obtained by reacting a diamino compound comprising as a main component at least one diamine having amino groups at the m-position thereof selected from the group consisting of a diamine represented by formula (IV)

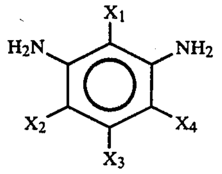

wherein $X_1$, $X_2$, $X_3$ and $X_4$, which may be the same or different, each represents $-H$, $-CH_3$, $-C_2H_5$, $-NO_2$, $-F$, $-COOH$ or $-Cl$;

a diamine represented by formula (V)

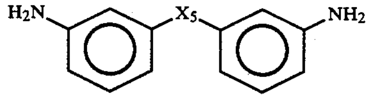

wherein $X_5$ represents $-O-$, $-SO_2-$, $-CH_2-$, $-S-$, $-CO-$ or

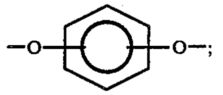

and a diamine represented by formula (VI)

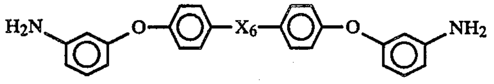

wherein $X_6$ represents $-SO_2-$, $-C_9CH_3)_2$ OR $-c(cf3)_2-$; with a tetracarboxylic acid compound comprising as a main component a tetracarboxylic acid dianhydride represented by formula (VII)

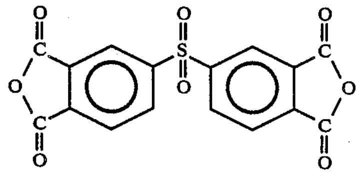

dissolved in (B) at least one organic polar solvent selected from the group consisting of N,N-dimethylacetamide, N,N-dimethylformamide, bis (2-methoxyethyl)ether, cresol and halogenated phenols;

forming a shaped article of the polyimide precursor from the organic polar solvent solution of the polyimide precursor; and imidizing the resulting shaped article of the polyimide precursor.

6. A process as in claim 5, wherein the reaction is carried out at a temperature of 80° C. or less.

7. A process as in claim 5, wherein the polyamide precursor has a logarithmic viscosity of from 0.3 to 5.0.

8. A process as in claim 5, wherein the polyamide precursor solution has a concentration of from 5 to 30% by weight.

9. A process as in claim 5, wherein the organic polar solvent is N,N-dimethylacetamide.

10. A colorless transparent polyimide shaped article as in claim 1, wherein $X_5$ and $X_6$ are $-SO_2-$.

11. A process as in claim 5, wherein $X_5$ and $X_6$ are $-SO_2-$.

* * * * *